United States Patent [19]
Martinez

[11] Patent Number: 6,137,806
[45] Date of Patent: Oct. 24, 2000

[54] INTELLIGENT NETWORK WITH ALTERNATE ROUTING OF SIGNALLING MESSAGES, AND METHOD OF OPERATING SUCH NETWORK

[75] Inventor: Edgar Martinez, Arlington Heights, Ill.

[73] Assignee: Northern Telecom Limited, Montreal, Canada

[21] Appl. No.: 08/996,156

[22] Filed: Dec. 22, 1997

[51] Int. Cl.[7] .............................. H04L 12/54; H04J 3/12
[52] U.S. Cl. ...................... 370/428; 370/524; 379/230
[58] Field of Search ................................. 370/391, 310, 370/376, 367, 379, 230, 522, 410, 524, 232, 216, 221, 238, 428; 379/229, 230, 114, 115, 219, 207

[56] References Cited

U.S. PATENT DOCUMENTS

| | | | |
|---|---|---|---|
| 5,430,719 | 7/1995 | Weisser, Jr. ............................. | 370/58.2 |
| 5,438,568 | 8/1995 | Weisser, Jr. ............................. | 370/60 |
| 5,566,235 | 10/1996 | Hetz ........................................ | 379/201 |
| 5,581,610 | 12/1996 | Hooshiari ................................ | 379/133 |
| 5,664,102 | 9/1997 | Faynberg ............................. | 395/200.76 |
| 5,930,348 | 7/1999 | Regnier et al. ..................... | 379/230 X |

FOREIGN PATENT DOCUMENTS 2153281  1/1996  Canada .

OTHER PUBLICATIONS

Abdi R. Modarressi and Ronald A. Skoog, "Signalling System No. 7: A Tutorial", *IEEE Communications Magazine*, Jul. 1990, pp. 19–35.

John Zaharychuk and Roy Sells, BNR Ltd., "Gateway Signal Transfer Points: Design, Services and Benefits", *ICC/Superecom '90*, pp. 0233–0240.

"Generic Switching and Signaling Requirements for Number Portability", Illinois Number Portability Workshop, Issue 1.024, Jun. 17, 1996, pp. 1–76, Editor J.J. Lichter, Lucent Technologies.

*Primary Examiner*—Joseph L. Felber
*Attorney, Agent, or Firm*—Venable; John P. Shannon

[57] ABSTRACT

In an intelligent network comprising a plurality of Service Signalling Points (SSP) and a Service Control Point (SCP), improved handling of overload conditions at the Service Control Point is provided by means of a Network Signalling Point interposed between the SSPs and the SCP. The Network Signalling Point (NSP) has a store for storing a copy of each message the NSP sends to various Point Codes, including that of the SCP; and service software for monitoring its links based upon associated Point Codes. If the NSP does not receive, within a preset time period, a response to a message sent to a particular destination Point Code via a particular link that is intact, the service software module will retrieve the stored copy of the message, replace the original destination Point Code with an alternative Point Code, and route the modified message to the alternative Point Code. The NSP may also filter Automatic Code Gapping messages sent from the Service Control Point to Service Switching Points in dependence upon messaging network conditions. The NSP may also generate its own Automatic Code gapping messages and send them to selected Service Switching Points.

18 Claims, 4 Drawing Sheets

INTELLIGENT NETWORK WITH ALTERNATE ROUTING OF SIGNALLING MESSAGES, AND METHOD OF OPERATING SUCH NETWORK

TECHNICAL FIELD

The invention relates to telecommunications systems and methods of operating them and is especially applicable to so-called "intelligent networks".

BACKGROUND ART

Telecommunications systems known as "Intelligent Networks" (IN) or "Advanced Intelligent Networks" (AIN) employ Signalling System No. 7 (SS7) which was adopted by the International Consultative Committee for Telephone and Telegraph (CCITT). Signalling system No. 7 messages are exchanged between network elements to deploy selected services and to set up and route calls. The messages are passed by an out-of-band signalling system which is separate from the trunks which carry the calls themselves. For an overview of SS7, the reader is directed to an article, "Signalling System No. 7: A Tutorial" by A. R. Modarressi and R. A. Skorg, IEEE *Communications Magazine*, July 1990, which is incorporated herein by reference.

For general information about intelligent network components and their operation, the reader is directed to U.S. Pat. Nos. 5,581,610 and 5,438,568, which are incorporated herein by reference, and to the various accepted or proposed intelligent networks standards documents including:

TR-NWT-001284 AIN 0.1 SSP Generic requirements

TR-NWT-001285 AIN 0.1 SCP interface

GR-1298-CORE AIN 0.2 Generic requirements

GR-1299-CORE AIN 0.2 SCP interface.

The main elements of such intelligent networks include Service Switching Points (SSPs), Signal Transfer Points (STPs) and Service Control Points (SCPs) connected to each other by SS7 data links for carrying signalling. All of these elements have similar Message Transfer Part (MTP) and Signalling Connection Control Part (SCCP) communications software to enable them to communicate with each other via the SS7 data communications network. A Service Control Point is an "intelligence centre" with specific logic and access to application databases enabling it to deliver various combinations of features, such as 1-800 number service and call redirection. A Signal Transfer Point (STP) is a signalling hub or concentrator, typically connecting several Service Switching Points to an SCP. A Service Switching Point (SSP) is a network node normally associated with a stored program central office switch equipped with Signalling System Number 7 (SS7) messaging links to permit communication with the SCPs and which, in addition to the usual call processing software, has special Service Signalling Function (SSF) software. The SCP has comparable Service Control Function (SCF) software.

The Service Signalling Functions include (i) Transaction Capabilities Application Part (TCAP) messaging, which SSPs and SCPs use to determine how to process a particular call, and (ii) Integrated Services User Part and Capability (ISDNUP) messaging which the SSP switches use to set up a path for a particular call once it has been determined whence the call should be routed.

The SSP's AIN software includes a plurality of "Point-in-Call triggers" which can be provisioned or set to interrupt call processing momentarily and initiate a TCAP query to the SCP for instructions on how to complete the call processing. Based upon the instructions received in a TCAP message in reply, the originating end office switch seizes a trunk to a neighbouring switch and creates an Initial Address Message which it sends to the neighbouring switch via the SS7 network. The Initial Address Message includes various parameters which will control routing of the call to its destination.

The SCP is identified within the network by a Point Code (PC). When issuing a TCAP message, the SSP will include in the header (as the Destination Point Code (DPC)) the PC of the SCP to which it is to be sent and its own Point Code as the Originating Point Code (OPC). Usually, the message will be relayed by way of a Signal Transfer Point (STP). The Message Transfer Part (MTP) module of the STP will simply detect the DPC and choose a corresponding outgoing link to the SCP. The STP will monitor its links continuously. If the link to the SCP is unavailable for some reason, the STP will simply return a "link failure" message to the originating SSP and the call will not complete. The SSP will not attempt to query the SCP again until it receives a "link restored" message from the STP.

At present, the SSP will attempt to complete a call based upon the usual dialled digit translation using its own routing tables and only query the SCP if an AIN Point-in-Call trigger is encountered. With the increasing use of services like Local Number Portability (LNP), it is being proposed to have the digit translation for all calls done by the SCP before the call is routed. Hence, every call will require a TCAP query to an SCP for routing. This increasing traffic in the SS7 system could lead to congestion.

It is known to provide a "hot spare" for each STP so as to reduce the likelihood of a TCAP message not reaching the SCP. It is also known to interconnect a group of STPs so as to provide a limited form of alternate routing. If a TCAP query via one STP "times out", it can be routed to an alternative STP in the group. Cross connection of this group of STPs and duplication of links between the STP group and the SCP provide a certain amount of redundancy and reliability. It is still conceivable though that the links to the SCP could go down or overload and even that the processor in the SCP could overload.

The risk is even greater if a major emergency occurs, such as a natural disaster. In such circumstances, it is desirable for certain minimum communications to be maintained so as to ensure that essential services can be maintained. This entails maintaining communications with firefighting and medical teams, and the media, so that the government can communicate with the public.

A protocol for dealing with SCP overload has been proposed in Bellcore's AIN 0.1 SCP applications protocol TR-NWT-001284 issued 1 Aug. 1992, specifically at pages 2–164, item 2.10.7.1. In particular, Bellcore proposed that, when an SCP overloaded, it would send to the requesting SSP an Automatic Code Gapping (ACG) message which effectively would invite the SSP to increase the delay between subsequent TCAP requests for a certain duration. On receipt of an ACG message, the SSP would save a six digit code on a control list and start "gap" and "control duration" timers.

This approach is not entirely satisfactory because, in extreme overload conditions, the SSP itself can start to overload because it is having to store these six-digit codes and use the call gapping controls. In addition, the SCP would have to start transmitting ACG messages before it completely overloaded; otherwise it would not be capable of doing so. Hence, it would need some means for monitoring its CPU and initiating the sending of the ACG messages before it reached its capacity, perhaps at 80% or so. The SCP would already be over burdened and in danger of overloading. The additional monitoring, and the generation and sending of ACG messages, would add to that burden instead of taking away from it. Once the SCP overloaded, the SSPs would also be in danger of overloading because they have limited capacity to delay messages.

An object of the present invention is to mitigate the above-identified deficiencies and provide an improved way of dealing with overloading of an SCP or lack of availability of links to the SCP.

DISCLOSURE OF INVENTION

According to a first aspect of the present invention, there is provided a telecommunications network comprising a plurality of switching units equipped with SS7 messaging capabilities, at least one Service Processor, and a Network Signalling Point interposed between the switching units and the Service Processor and interconnected thereto by SS7 messaging links, the Network Signalling Point (NSP) having:

(i) message transfer means for routing signalling messages between the switching units and the service processor according to point codes in such messages storing a copy of each signalling message transmitted to said service processor, each copy message with an identifier specific to an originating call, and receiving from the service processor response signalling messages having corresponding identifiers;

(ii) means for monitoring the message transfer means and timing predetermined time intervals each commencing when a respective one of the signalling messages is transmitted and, if a response signalling message having an identifier corresponding to a particular identifier is detected within said predetermined time interval, causing said message transfer means to delete the stored copy message, but if no corresponding response signalling message with an identifier corresponding to said particular identifier is received within said predetermined time interval, causing said message transfer means to reference the stored copy of the message, change the destination point code to that of an alternative service processor, and route the changed message to that alternative service processor.

The monitoring means may also be operative when said particular link is a direct link and is not available to form a default message and return the default message to the originating SSP. The default message will initiate appropriate action by the SSP, such as playing an announcement or transferring the call.

The monitoring means may also generate such a default message if the attempt to route to an alternative Point Code failed. The Point Code might be that of an SCP or an HLR.

The monitoring means may also monitor Automatic Code Gapping messages sent from an SCP and addressed to one or more SSPs, selectively routing such ACG messages to their destination SSPs, and diverting at least some subsequent messages addressed to that SCP to an alternative SCP for a duration based upon durations in the ACG messages following specified ACG procedures.

According to a second aspect of the invention, there is provided a method of alternate routing of signalling messages in a telecommunications network comprising a plurality of switching units equipped with SS7 messaging capabilities, at least one Service Processor, and a Network Signalling Point interposed between the switching units and the Service Processor and interconnected thereto by SS7 messaging links, the method comprising the steps of, at the Network Signalling Point (NSP):

(i) routing signalling messages between the switching units and the service processor according to point codes in such messages;

(ii) setting a timer means, upon transmission of a message to the service processor, for timing a predetermined time interval following transmission of each signalling message to the service processor;

(iii) storing a copy of each signalling message transmitted to said service processor, each copy message with an identifier specific to the originating call;

(iv) monitoring in response signalling messages received from said service processor that include corresponding identifiers and detecting said corresponding identifiers, and;

if a said corresponding identifier corresponding to the identifier of a particular stored message is detected in a response signalling message within said predetermined time interval, deleting the stored copy message, but if a said corresponding identifier corresponding to the identifier of said particular stored message is not detected within said predetermined time interval, retrieving the stored copy of the message, changing the destination point code to that of an alternative service processor, and routing the changed message to that alternative service processor.

According to a third aspect of the present invention, there is provided a network signalling point for a network according to the first aspect, the network signalling point comprising message transfer means for performing Signal Transfer Point functionality with respect to SS7 messages communicated via its SS7 links, and monitoring means for monitoring the message transfer means, detecting failure of a signalling message to reach a particular Service Processor and routing a corresponding signalling message to an alternative Service Processor.

The message transfer means may comprise means for storing a copy of each signalling message sent to a service processor, with a corresponding identifier, and the monitoring means comprise timer means settable upon transmission of a signalling message to a service processor to time a predetermined time period, the monitoring means monitoring subsequent signalling messages from the service processor for response messages containing said identifier, and, if no response message is received within said predetermined time period, causing the message transfer means to retrieve the stored message and route the stored message to an alternative service processor, but, if a response message including the identifier is detected within said predetermined time period, causing the message transfer means to delete the stored copy.

Various features and advantages of the present invention will be apparent from the following description, taken in conjunction with the accompanying drawings, of preferred embodiments of the invention which are described by example only.

DETAILED DESCRIPTION OF PREFERRED EMBODIMENTS

Figure 1:
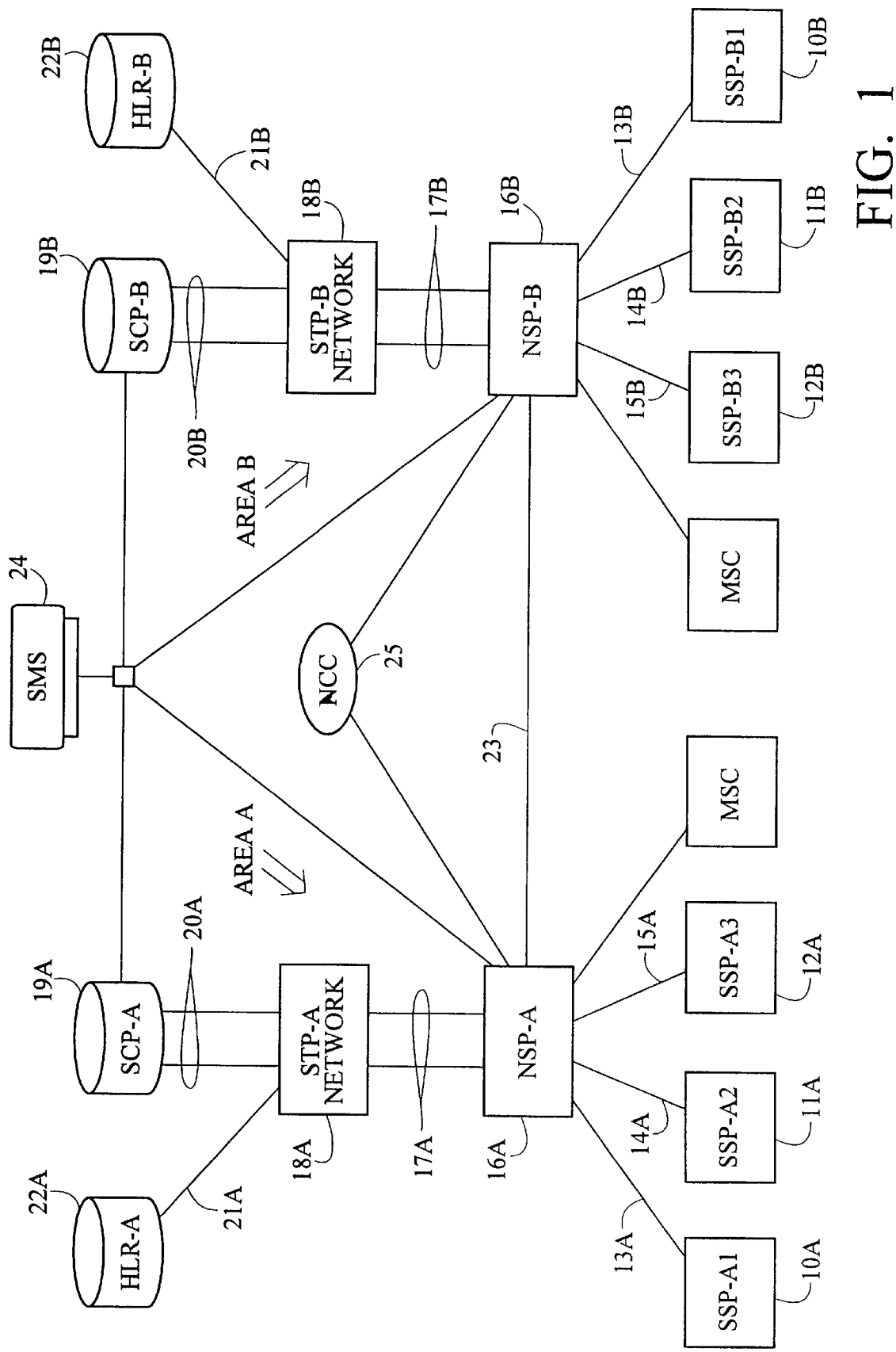
FIG. 1 illustrates a portion of an intelligent network comprising two areas, each having a Network Signalling Point, (NSP).

FIG. 1 illustrates a portion of an intelligent network which comprises two interconnected areas designated A and B, respectively. In area A, three Service Switching Points 10A, 11A and 12A are connected by SS7 data links 13A, 14A and 15A, respectively, to a Network Signalling Point 16A. For clarity, the trunks interconnecting the SSPs 10A, 11A and 12A are not shown. The Network Signalling Point 16A is connected by SS7 links 17A to a Signal Transfer Point network 18A which itself is connected to a Service Control Point 19A by SS7 links 20A. Although only two links 17A and two links 20A are shown, in practice there could be many more. In addition, the STP network 18A is connected by SS7 link 21A to a Home Location Register 22A containing data for mobile users. The STP network 18A will comprise a plurality of STPs interconnected in known manner to provide redundancy.

For convenience of description, the network segment in area B is a mirror image of the network segment in area A; its components have the same reference numerals as those of the identical or similar components of area A, but with the suffix letter B.

The two NSPs 16A and 16B are connected together by SS7 link 23 enabling NSP 16A to route queries into area B and NSP 16B to route queries into area A. A central Service Management System (SMS) 24 communicates with the two SCPs 19A and 19B and the NSPs 16A and 16B to provide updates and other provisioning; for example, of services. The mobile system will have an analogous provisioning system (not shown). In addition, the NSPs 16A and 16B are connected by the SS7 system to a Network Surveillance and Manual Network Control unit (NCC) 25 which facilitates manual or automatic control of re-routing of signalling messages. Thus, the NCC 25 may monitor the NSPs 16A and 16B for alarms, etc. and initiate suitable action if, for example, a link failed.

Both of the NSPs 16A and 16B have the same software for providing the normal routing functions of a STP, so only one will be described, namely NSP 16A, with reference to FIG. 2. NSP 16A has a physical interface layer for interfacing with physical links, which connect the NSP 16A to other network elements directly, as indicated at 26A, or indirectly via a STP network 18A and links 27A. The NSP 16A also has MTP and SCCP software modules that enable the NSP 16A to function like a STP and do simple routing by operating upon SS7 message headers. The MTP module can identify DPCs and OPCs and use the DPC to determine the outgoing link on which to relay the message. It can also determine whether the message is a TCAP message or an ISDNUP message, and route it to the appropriate TCAP or ISUP application software for treatment. The ISUP module handles ISUP messages in known manner and need not be discussed here. In addition, the NSP 16A includes TCAP applications software which covers the different kinds of TCAP messages that could be generated or received, i.e. IS41-MAP and GSM-MAP for messages from mobiles and AIN and CS-1 for messages from wire line network elements.

In addition, the NSP 16A includes customer data which includes essential information, such as default or alternate routing data, for use if for some reason the NSP 16A cannot communicate with the appropriate SCP or HLR. The NSP 16A includes several other software modules which a STP would not have, namely Flexible Service Logic (FSL), Service Management System (SMS) interface logic and Operation, Surveillance and Management (OSM) interface logic.

The OSM module interfaces the NSP 16A to the Network Control Centre 25 which provides operation, surveillance and management functions in a manner which is analogous to that in other SS7 systems. The OSM module is capable of monitoring link activity, and so on, so it interfaces with the MTP and SCCP modules.

The SMS interface logic communicates with the central SMS unit 24 using established protocols. The SMS module interfaces the SMS 24 with the CUSTOMER DATA module, (which includes Calling Party numbers, Called Party numbers and other TCAP data), the ISUP module and the Flexible Service Logic (FSL) module. The NSP 16A also has a timer 28A associated with the FSL module and a store 29A associated with the MTP module for temporarily storing messages, as will be explained later.

Figure 2:
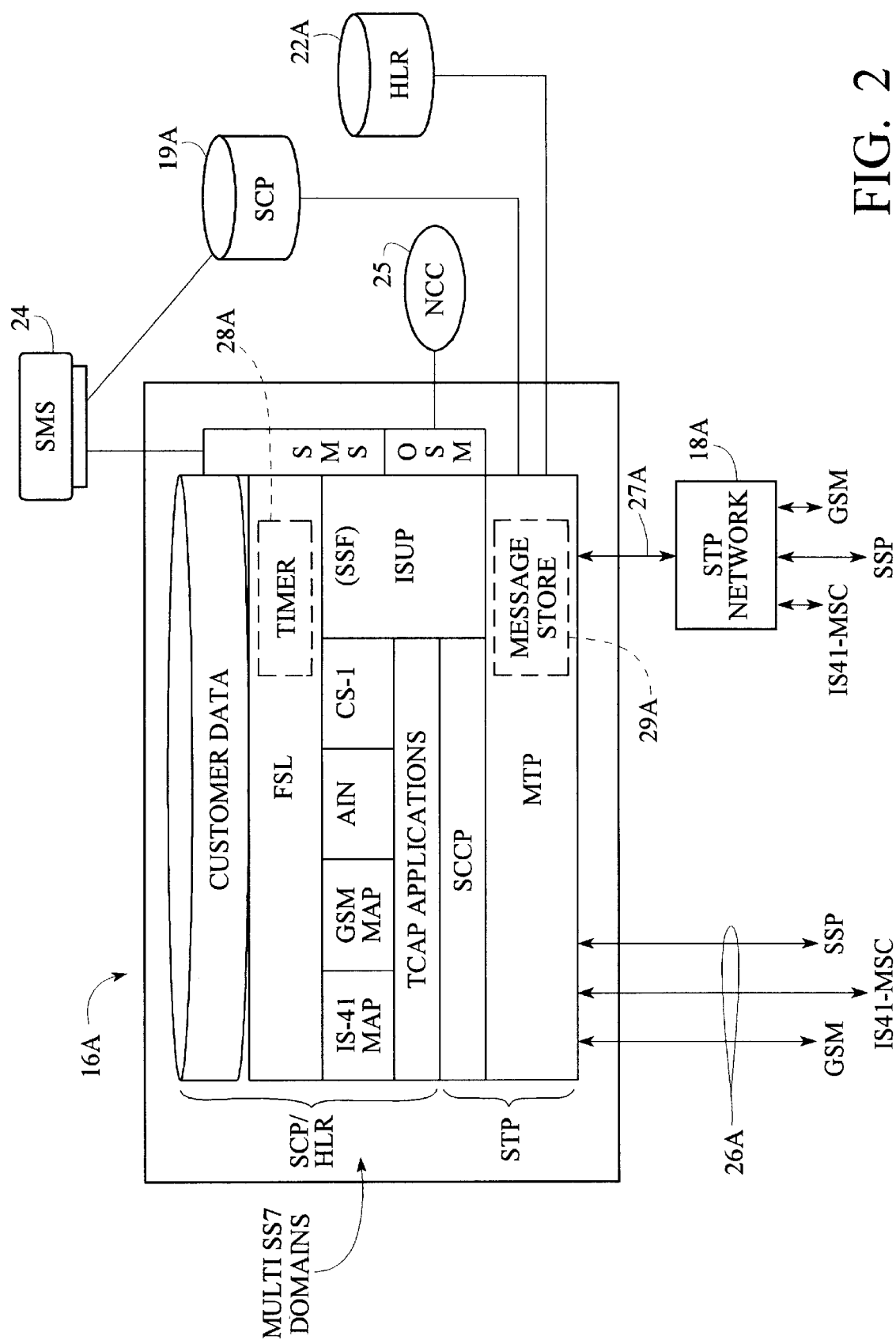
FIG. 2 illustrates software modules in the Network Signalling Point.

Thus, as indicated in FIG. 2, the NSP 16A includes MTP and SCCP modules which usually are found in a STP, and other modules which perform functions more usually associated with a SCP or a HLR.

Figure 3:
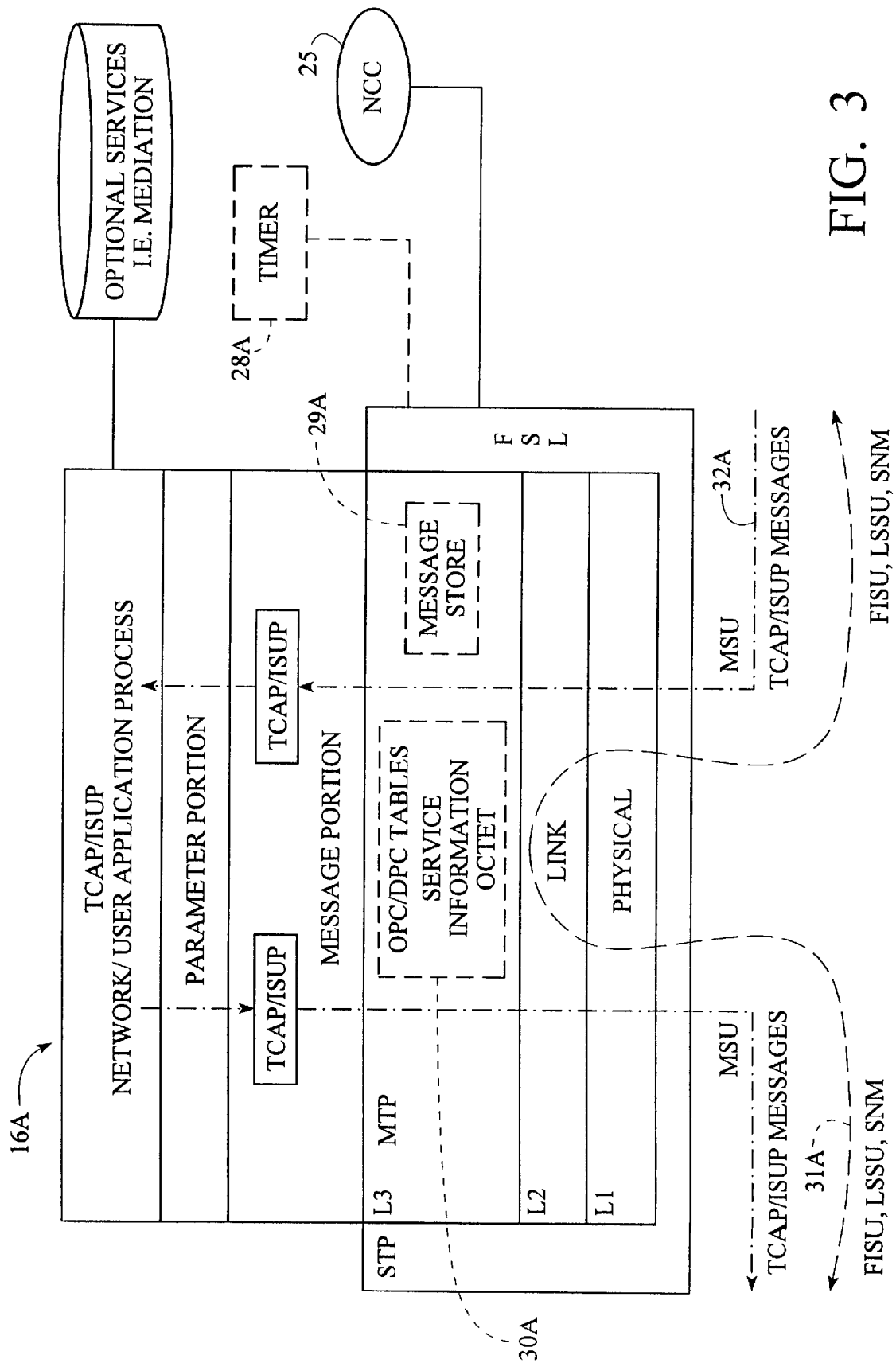
FIG. 3 illustrates message flow through the Network Signalling Point.

In FIG. 3, which illustrates NSP Management Message Flow and Routing, the NSP 16A's software modules are depicted according to whether they are providing STP functionality or the higher level functionality. The FSL module is shown linked to the NCC 25 and has access to a database 30A containing wireline and wireless routing tables, including OPC/DPC tables. Each DPC is assigned to a particular SCP or HLR and routing is based upon these Point Codes. Examples of entries in these routing tables are shown in Table I.

TABLE I

| OPC | | | Alternative NSP LINK SET |
|---|---|---|---|
| Wireline Switch NSP Routing Table | | | |
| | Primary SCP-DPC | Secondary SCP-DPC | |
| 111 | 555 | 888 | 1 × 222 |
| 222 | 555 | 888 | 1 × 333 |
| Mobile Switch NSP Routing Table | | | |
| | Primary HLR-DPC | Secondary HLR-DPC | |
| 333 | 444 | 777 | 1 × 122 |

Link layer software L1 interfaces with the physical links. Link layer L2 includes a link monitor module which monitors the NSP links in known manner by repeatedly sending Link Status Signal Units (LSSU) to determine whether or not each link is available. The FSL monitors this link monitor. In contrast to a conventional STP, where the link monitor can do nothing more than identify when a link to a particular DPC goes down and select the next link in the link set, or combined link set, in its table to route the message to the SCP, the NSP's Flexible Service Logic (FSL) will be capable of changing the order in which the links are selected, or add another link set. Consequently, as shown in Table I, the database 30A used by the FSL has provision for specifying alternative link sets for a particular DPC/SCP and this data can be modified, from the user network control and surveillance centre (NCC) 25.

As shown in FIG. 3, the MTP handles other Message Signal Units including the Fill-In Signal Unit (FISU) and the Signalling Network Management (SNM) messages, represented by broken line 31A, for reasons which are well-known to one skilled in this art. They too would be monitored by the FSL to determine conditions.

The MTP module also has access, at layer L3, to OPC/DPC routing tables enabling it to identify a particular link on which to send a message according to the OPC or DPC in the message. In addition, the MTP layer L3 can detect from the Service Information Octet (SIO) in the message header whether the message is for itself and, if so, route it to the appropriate TCAP/IS41 or ISUP application module for processing.

The Flexible Service Logic module enables the Link and Point Code tables in database 30A to be modified.

The store 29A, in which the NSP temporarily stores the messages it sends out, particularly to a SCP, may be part of the database used for DPC/OPC.

The SCCP functions are well known and will not be described here. Generally, whereas the MTP handles messages, the SCCP deals with protocols. The SCCP monitors for Point Codes and can override those used by the MTP. The MTP layer monitors physical links.

In addition to performing the usual routing functions of a STP, the NSP 16A will be able to provide SS7 network protection against link outages originating from SSPs, STPs and SCPs. The NSP 16A by means of the FSL, has access to TCAP messages enabling it to detect Automatic Code Gapping messages from a SCP and prevent propagation of such ACG messages to a SSP. For a subsequent time period based upon Automatic Code Gapping procedures, the NSP 16A will route to an alternative SCP at least some of the queries addressed to the SCP which issued the ACG messages. The routing database 30 (and others as appropriate) can be updated by a customer via the SMS 24, so the NSP 16A's Service Control Environment (SCE) can provide networked recovery services defined by the customer based upon their network configuration and needs.

As indicated by chain-link line 32A in FIG. 3, the MTP layer module may receive TCAP/ISUP messages which may be directly from a SSP or MSC, or indirectly via a STP, as mentioned previously. The MTP module will determine from the SIO whether the incoming message is a TCAP message or an ISDNUP message and route it to the SCCP module or the ISDNUP module, as appropriate. If it is a TCAP message, the SCCP module will determine which protocol is involved and route the message via the TCAP applications module, to the appropriate one of the four TCAP domains, namely IS41, GSM, AIN and CS-1. Following processing in this domain, which includes parameter decoders, the message will be passed to the Flexible Service Logic module. The FSL obtains whatever information is appropriate from the CUSTOMER DATA, for example call-forwarding particulars, inserts the necessary information to be included in the Signalling Information Field for attention by the SCP or HLR and the message then is processed in the reverse direction to include it in a TCAP message for the SCP/HLR. This process works in reverse for communications from the SCP to a SSP.

To summarize, the NSP differs from a STP in that it has (i) storage means 29A for storing SS7 messages until either a reply is received or timer 28A times out; (ii) FSL software for monitoring the MTP module to detect link conditions, the TCAP domains (IS-41, AIN, etc.) ACG messages, and other TCAP messages to determine when overload conditions or other salient conditions necessitate action, such as redirection of TCAP messages; and for reading and modifying parameters of TCAP messages, or generating its own messages; (iii) interface software OSM for communications with the NCC 25; (iv) software and database for providing SCP/HLR functionality.

Figure 4:
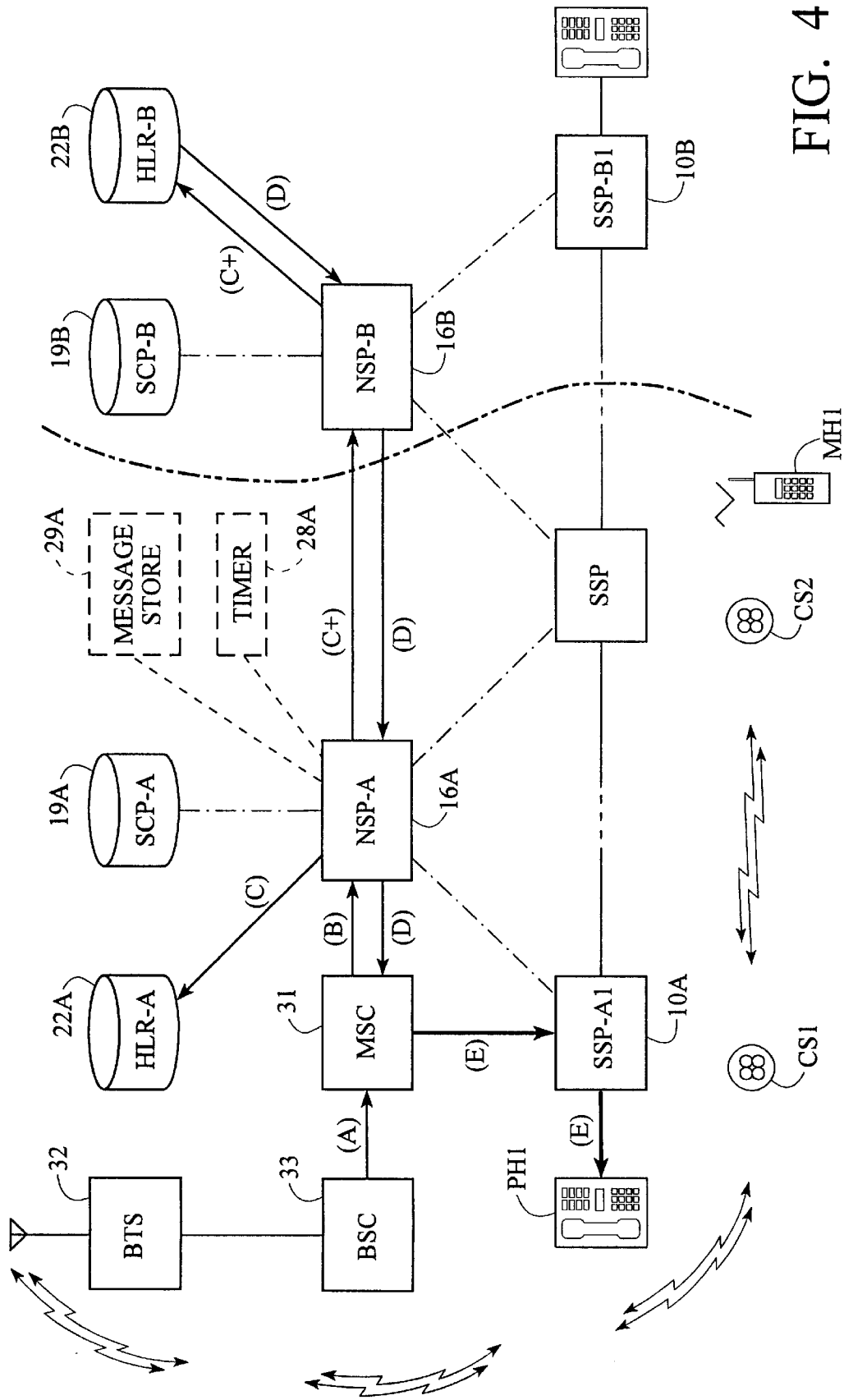
FIG. 4 illustrates re-routing of a normal call in the network portion of FIG. 1.

The handling of a call in the combined networks of FIG. 1 will now be described, as an example, with reference to FIG. 4 and Table I. In FIG. 4, the calls/messages are shown as arrows and labelled with a letter in parentheses.

In order to illustrate that the system of the present invention handles calls from mobile users, FIG. 4 shows an additional mobile switching centre (MSC 31) coupled to SSP 10A by trunks (not shown) and to NSP 16A by a SS7 link (not shown). A mobile user MH1 communicates with the mobile switching centre 31 by way of cell sites CS2 and CS1, base transceiver station (BTS) 32 and base station controller (BSC) 33, the latter being connected to mobile switching centre 31 by a landline (not shown).

For the example, it is assumed that the mobile caller MH1 tries to call a wireline station identified as PHI at SSP 10A. The mobile user MH1 dials the normal seven digits which are relayed via cell sites CS1 and CS2, base transceiver station 32 and base station controller 33 to mobile switching centre 31 (Call A). Upon receipt of the digits, the mobile switching centre 31 formulates a RouteRequest message, including the dialled digits and the DPC address for the associated HLR 22A, and sends the message to NSP 16A (Message B). The NSP 16A recognizes that it is a RouteRequest and a normal call. (A 9-1-1 call would be handled differently. For an explanation of 9-1-1 call handling in intelligent networks, the reader is directed to copending patent application No. 08/995,917 entitled "METHOD AND APPARATUS FOR ROUTING EMERGENCY SERVICES CALLS IN AN INTELLIGENT NETWORK", which is incorporated herein by reference)

The NSP 22A acts like a STP and sends the query to the HLR 16A (Message C). Before doing so, however, NSP 16A starts its timer 28A and makes a copy of message C which it stores in its store 29A, indexed according to Calling Party number. (The table could be indexed by DPC and then Calling Party number.) If, before the timer 28A times-out, the NSP 16A receives a RequestRoute response message in response to the query, it will locate the stored message (C) by means of the TCAP Transaction ID and the Calling Party number therein in known manner and delete the stored message C. Alternatively, a trunk ID could be used instead of the Calling Party number since that too would uniquely identify the call which generated the query.

Assuming that the SS7 link between NSP 16A and HLR 22A is "up" but, for some reason, the HLR 22A is overloaded and cannot respond, the timer 28A in the NSP 16A will time out. (If the link were not available for some reason, then the NSP 16A would try an alternate link set obtained from its routing table—see Table I. This would use the usual alternate link selection mechanism at the MTP level.)

Because the links to HLR 22A are intact, NSP 16A will not try an alternate link when its timer 28A times out. Instead, it will retrieve the copy of message C from store 29A, change the destination original Point Code (of primary HLR 22A) to the Point Code of secondary HLR 22B, save the modified message C+ back into message store 29A, start the timer 28A again, and route the message C+ to HLR 22B via NSP 16B.

Assuming that message C+ reaches HLR 22B, the latter will determine the routing number of SSP 10A from its tables, include it in a RouteRequest response (message D), and send message D to NSP 16B, which will relay it to NSP 16A. Upon receipt of message D, and recognizing the Calling Party number of stored message C+ in its header, NSP 16A will delete the copy of message C+ from store 28A and relay the response message D to the mobile switching centre 31. The mobile switching centre 31 will then route the call (Call E) to SSP 10A for completion to the called party at station PH1.

It should be noted that, for the above-described sequence, the NSPs merely operate at the MTP level, i.e. provide STP functionality, and do not need to know the content of the messages. Consequently, it does not matter what kind of TCAP message is involved, i.e. IS41 or AIN, and the NSPs can handle messages from SCPs or HLRs. Hence, the process would be similar if the call came from a wireline caller PH1 rather than mobile user MH1, but the TCAP message would be AIN or CS-1 rather than IS41, and would be handled by SCP 19B when an initial attempt to route to SCP 19A failed.

So long as the NSP 16A is communicating with the secondary network B via NSP 16B, it would be possible for it to advise NSP 16B, using FSL to FSL communication via SS7 link 23, to make the required copy of the message C+ and store it, in which case NSP 16A could then delete it from its own store 29A. However, if NSP 16A were transmitting the message to a STP or directly to a SCP or HLR in the other network B, which is feasible, it would need to retain its stored copy of the modified message C+ to ensure that, if this query also timed out, it would be able to react appropriately, for example, with a default message.

In the event that the attempt to route to the secondary SCP 22B also failed, which, though unlikely, could happen with catastrophic situations such as earthquakes, volcanic eruptions, and other extensive natural disasters involving not only considerable traffic on the network but also physical damage to the network, then NSP 16A's timer 28A will time out when NSP 16B does not respond to message C+. Consequently, NSP 16A will then need to take some other action. One option is for it to send a "default" TCAP message to the mobile switching centre 31. This "default" TCAP message could comprise an instruction to route the call to a human operator for handling. It could also comprise an instruction to play a message to the caller. The message would be created by the Flexible Service Logic module (FSL).

It should be appreciated that, in the above example, messages A to D are SS7 messages whereas call E represents the completion of the voice or data call itself, which would entail the exchange of ISDNUP messages between mobile switching centre 31 and SSP 10A to set up the required trunks in the usual way.

It should be noted that the NSP FSL could provide call gapping for an HLR. At present, an HLR cannot generate ACG messages, nor an MSC respond to them. Nevertheless, the NSP FSL could provide equivalent call gapping functionality by delaying messages to the HLR in an analogous manner to Automatic Code Gapping by a SSP.

It should be noted, therefore, that the present invention provides a significant enhancement for mobile users in that, previously, failure to complete the call to the HLR would result in the message being lost, but now the NSP may complete the transaction and return a message to the mobile switching centre.

INDUSTRIAL APPLICABILITY

The invention provides for message re-routing or default service treatment for LNP, HLR, LIDB, CLASS GTT, 1-800 and 1-500 services.

What is claimed is:

1. A telecommunications network comprising a plurality of switching units equipped with SS7 messaging capabilities, at least one Service Processor, and a Network Signalling Point interposed between the switching units and the Service Processor and interconnected thereto by SS7 messaging links, the Network Signalling Point (NSP) having:

(i) message transfer means for routing signalling messages between the switching units and the service processor according to point codes in such messages, storing a copy of each signalling message transmitted to said service processor, each copy message with an identifier specific to an originating call, and receiving from said service processor response signalling messages having corresponding identifiers;

(ii) means for monitoring the message transfer means and timing, a predetermined time interval commencing when a signalling message with a particular identifier is transmitted thereby and, if a response signalling message having an identifier corresponding to said particular identifier is detected within said predetermined time interval, causing said message transfer means to delete the stored copy message, but if no corresponding response signalling message with an identifier corresponding to said particular identifier is received within said predetermined time interval, causing said message transfer means to retrieve the stored copy of the message, change the destination point code to that of an alternative service processor, and route the changed message to that alternative service processor.

2. A network according to claim 1, wherein the monitoring means is operative to monitor said messaging links and, upon detection that a direct link to a particular service processor is not available, to intercept signalling messages having the destination point code of that particular service processor and transmit a default message addressed with an originating point code of the intercepted message.

3. A network according to claim 2, wherein the network signalling point further comprises means for notifying a network controller centre that the service processor is unavailable.

4. A network according to claim 1, wherein the monitoring means also sets a predetermined time interval upon transmission of said changed message to the alternative service processor, the message transfer means stores a copy of the changed message, with an identifier specific to the originating call, and the monitoring means is operative to detect that a response signalling message containing a corresponding identifier was not received from the alternative service processor within the predetermined time interval, and cause the message transfer means to transmit a default message addressed with the originating point code in the stored copy message and delete the stored copy of the changed message.

5. A network according to claim 1, wherein the switching units comprise intelligent network Service Switching Points, the service processor comprises an intelligent network Service Control Point, the means for monitoring also serves to monitor for Automatic Code Gapping messages sent from a Service Control Point and addressed to one or more Service Switching Points, selectively interrupt routing of such Automatic Code Gapping messages to their destination Service Switching Points, and divert to an alternative Service Control Point, in according with Automatic Code Gapping procedures, subsequent signalling messages addressed to the Service Control Point that transmitted the Automatic Code Gapping messages.

6. A network according to claim 1, wherein the switching units comprise intelligent network Service Switching Points and the service processor comprises an intelligent network Service Control Point.

7. A network according to claim 1, wherein at least one of the switching units is a mobile service switching centre and the service processor comprises a Home Location Register unit.

8. A method of alternate routing of signalling messages in a telecommunications network comprising a plurality of switching units equipped with SS7 messaging capabilities, at least one Service Processor, and a Network Signalling Point interposed between the switching units and the Service Processor and interconnected thereto by SS7 messaging links, the method comprising the steps of, at the Network Signalling Point (NSP):

(i) routing signalling messages between the switching units and the service processor according to point codes in such messages;

(ii) setting a timer means, upon transmission of a message to the service processor, for timing a predetermined time interval following transmission of each signalling message to the service processor;

(iii) storing a copy of each signalling message transmitted to said service processor, each copy message with an identifier specific to the originating call;

(iv) monitoring response signalling messages received from said service processor that include corresponding identifiers and detecting said corresponding identifiers and;

if a said corresponding identifier corresponding to the identifier of a particular stored message is detected in a response signalling message within said predetermined time interval, deleting the stored copy message, but if a said corresponding identifier corresponding to the identifier of said particular stored message is not detected within said predetermined time interval, retrieving the stored copy of the message, changing the destination point code to that of an alternative service processor, and routing the changed message to that alternative service processor.

9. A method according to claim 8, further comprising the step of monitoring said links and detecting that a direct link to a particular service processor is not available, intercepting subsequent signalling messages having the destination point code of that particular service processor and transmitting a default message addressed with an originating point code of the intercepted message.

10. A method according to claim 8, further comprising the steps of setting the timer means upon transmission of said changed message to the alternative service processor to time the predetermined time interval, storing a copy of the changed message, with an identifier specific to the originating call, detecting that a response signalling message containing a corresponding identifier was not received from the alternative service processor within the predetermined time interval, transmitting a default message addressed with the originating point code in the stored copy message and deleting the stored copy of the changed message.

11. A method according to claim 9, further comprising the step of notifying a network controller centre that the particular service processor is unavailable.

12. A method according to claim 8, in a said network wherein the switching units comprise intelligent network Service Switching Points and the service processor comprises an intelligent network Service Control Point, the method further comprising the steps of, at the network signalling point, monitoring Automatic Code Gapping messages sent from a Service Control Point and addressed to one or more Service Switching Points, selectively interrupting routing of such Automatic Code Gapping messages to their destination Service Switching Points, and diverting to an alternative Service Control Point, in according with Automatic Code Gapping procedures, subsequent signalling messages addressed to the Service Control Point that transmitted the Automatic Code Gapping messages.

13. A network signalling point for a network comprising a plurality of switching units equipped with SS7 messaging capabilities and at least one Service Processor, the network signalling point for connection by SS7 messaging links between the switching units and the Service Processor, the network signalling point comprising message transfer means for performing Signal Transfer Point functionality with respect to SS7 messages communicated via its SS7 links, and monitoring means for monitoring the message transfer means, detecting failure of a signalling message to reach a particular service processor within a predetermined time interval and causing the message transfer means to route a corresponding signalling message to an alternative service processor.

14. A network signalling point according to claim 13, wherein the message transfer means comprises means for storing a copy of each signalling message sent to a Service processor, with its identifier, and the monitoring means comprises timer means settable upon transmission of a signalling message to a Service Processor to time said predetermined time interval, the monitoring means being arranged to monitor subsequent signalling messages from the Service Processor for a response message containing a corresponding identifier, and, if no response message containing a said corresponding identifier is received within said predetermined time interval, cause the message transfer means to retrieve the stored copy of the message and route the stored copy of the message to an alternative service processor, but, if a response message including a said corresponding identifier is detected within said predetermined time interval, cause the message transfer means to delete the stored copy of the message.

15. A network signalling point according to claim 13, wherein the monitoring means is arranged to monitor said links and, upon detection that a direct link to a particular service processor is not available, cause the message transfer means to intercept subsequent signalling messages having the destination point code of that particular service processor and transmit a default message addressed with the originating point code of the intercepted message.

16. A network signalling point according to claim 15, wherein the monitoring means further comprises means for notifying a network controller centre that the service processor is unavailable.

17. A network signalling point according to claim 13, wherein the monitoring means sets a predetermined time interval upon transmission of said corresponding signalling message to the alternative service processor, the message transfer means stores a copy of the changed message, with an identifier specific to the originating call, and the monitoring means is operative to detect that a response signalling message containing a corresponding identifier was not received from the alternative service processor within the predetermined time interval, and cause the message transfer means to transmit a default message addressed with the originating point code in the stored copy message and delete the stored copy of the changed message.

18. A network signalling point according to claim 13, for a network wherein the switching units comprise intelligent network Service Switching Points, the service processor comprises an intelligent network Service Control Point, the network signalling point comprising means for monitoring Automatic Code Gapping messages sent from a Service Control Point and addressed to one or more Service Switching Points, selectively interrupting routing of such Automatic Code Gapping messages to their destination Service Switching Points, and diverting to an alternative Service Control Point, in according with Automatic Code Gapping procedures, subsequent signalling messages addressed to the Service Control Point that transmitted the Automatic Code Gapping messages.

* * * * *